(12) United States Patent
Morena et al.

(10) Patent No.: US 10,543,875 B2
(45) Date of Patent: Jan. 28, 2020

(54) EXTENDABLE TRAILER FOR FREIGHT CONTAINERS

(71) Applicant: ÉQUIPEMENT MAX-ATLAS INTERNATIONAL INC., St-Jean-sur-Richelieu (CA)

(72) Inventors: Andrew Morena, St-Léonard (CA); Patrick Nadon, Châteauguay (CA)

(73) Assignee: ÉQUIPEMENT MAX-ATLAS INTERNATIONAL INC., St-Jean-sur-Richelieu, Quebec (CA)

( * ) Notice: Subject to any disclaimer, the term of this patent is extended or adjusted under 35 U.S.C. 154(b) by 157 days.

(21) Appl. No.: 15/829,114

(22) Filed: Dec. 1, 2017

(65) Prior Publication Data

US 2018/0170458 A1    Jun. 21, 2018

Related U.S. Application Data

(60) Provisional application No. 62/436,636, filed on Dec. 20, 2016.

(51) Int. Cl.
*B62D 53/06*    (2006.01)
*B62D 65/00*    (2006.01)

(52) U.S. Cl.
CPC .......... *B62D 53/067* (2013.01); *B62D 65/00* (2013.01)

(58) Field of Classification Search
CPC ...... B62D 53/067; B62D 21/14; B60P 1/6481
See application file for complete search history.

(56) References Cited

U.S. PATENT DOCUMENTS

| 1,471,549 | A |   | 10/1923 | Clement |
|---|---|---|---|---|
| 3,508,762 | A |   | 4/1970 | Pratt |
| 3,557,980 | A |   | 1/1971 | Klaus |
| 3,913,933 | A |   | 10/1975 | Visser et al. |
| 4,561,671 | A |   | 12/1985 | DeWitt et al. |
| 4,566,714 | A | * | 1/1986 | De Witt ................ B60P 1/6481 280/142 |
| 4,580,805 | A |   | 4/1986 | Bertolini |

(Continued)

FOREIGN PATENT DOCUMENTS

| CA | 2299228 C | 10/2002 |
|---|---|---|
| CA | 2380282 C | 12/2002 |

(Continued)

OTHER PUBLICATIONS

Fliegl YouTube video posted Oct. 17, 2014: https://www.youtube.com/watch?v=7cLrBLN8dmU.
Fliegl Trailer Brochure.

*Primary Examiner* — Brian L Swenson
(74) *Attorney, Agent, or Firm* — Norton Rose Fulbright Canada LLP

(57) ABSTRACT

A trailer for transporting a container has a frame mountable to a vehicle. The frame has a rear frame section mountable above a rear wheel assembly of the trailer, and a front frame section connected to and disposed forward of the rear frame section in a forward direction of travel of the vehicle. The front frame section has a king pin mountable to a hitch of the vehicle and a forward-most end. The forward-most end is moveable relative to the kingpin in a direction parallel to the forward direction of travel to extend and shorten a length of the front frame section between a fully-lengthened configuration and a fully-shortened configuration.

20 Claims, 5 Drawing Sheets

(56) References Cited

U.S. PATENT DOCUMENTS

| | | | |
|---|---|---|---|
| 4,806,065 A * | 2/1989 | Holt | B62D 53/065 280/425.2 |
| 4,958,845 A * | 9/1990 | Parks | B62D 53/067 280/149.2 |
| 5,794,960 A * | 8/1998 | Sill | B62D 53/061 280/425.2 |
| 6,186,533 B1 | 2/2001 | Alaniz | |
| 6,659,524 B1 | 12/2003 | Carlson | |
| 6,969,104 B2 | 11/2005 | Green | |
| 7,552,933 B1 | 6/2009 | Beckman | |
| 7,677,625 B2 | 3/2010 | Gosselin et al. | |
| 7,784,812 B1 | 8/2010 | Lares | |
| 7,845,700 B2 | 12/2010 | Gosselin et al. | |
| 7,850,184 B2 | 12/2010 | Beckman, Sr. | |
| 7,909,387 B2 | 3/2011 | Gosselin et al. | |
| 8,070,214 B2 | 12/2011 | Gosselin et al. | |
| 8,136,858 B2 | 3/2012 | Gosselin et al. | |
| 8,191,957 B2 | 6/2012 | Gosselin et al. | |
| 8,328,263 B1 | 12/2012 | Alexander et al. | |
| 8,333,401 B2 | 12/2012 | Lares | |
| 8,910,989 B1 | 12/2014 | Boltz | |
| 9,302,708 B2 | 4/2016 | Ingels et al. | |
| 9,422,015 B1 | 8/2016 | Fraley et al. | |
| 9,505,440 B2 | 11/2016 | Ingels et al. | |
| 9,522,707 B2 | 12/2016 | Kern | |
| 2005/0057059 A1 | 3/2005 | Green | |
| 2006/0108774 A1 | 5/2006 | Raymond | |
| 2006/0181063 A1 | 8/2006 | Eddings | |
| 2007/0194556 A1 | 8/2007 | Kleysen | |
| 2007/0205617 A1 | 9/2007 | Hahn et al. | |
| 2009/0160163 A1 | 6/2009 | Gosselin et al. | |
| 2009/0160216 A1 | 6/2009 | Gosselin et al. | |
| 2010/0001029 A1 | 1/2010 | Tai | |
| 2010/0109309 A1 | 5/2010 | Kootstra | |
| 2010/0133781 A1 | 6/2010 | Gosselin et al. | |
| 2010/0327558 A1 | 12/2010 | Lares | |
| 2011/0047772 A1 | 3/2011 | Gosselin et al. | |
| 2011/0140473 A1 | 6/2011 | Gosselin et al. | |
| 2011/0187084 A1 | 8/2011 | Walters, Jr. | |
| 2011/0272900 A1 | 11/2011 | Lares | |
| 2012/0061984 A1 | 3/2012 | Gosselin et al. | |
| 2013/0001974 A1 | 1/2013 | Clark et al. | |
| 2013/0038043 A1 | 2/2013 | Brown et al. | |
| 2015/0084314 A1 | 3/2015 | Ingels et al. | |
| 2015/0284041 A1 | 10/2015 | Kern | |
| 2016/0137238 A1 | 5/2016 | Faymonville | |
| 2016/0200362 A1 | 7/2016 | Ingels et al. | |
| 2016/0257361 A1 | 9/2016 | Habernegg | |
| 2017/0106926 A1 | 4/2017 | Habernegg | |

FOREIGN PATENT DOCUMENTS

| | | |
|---|---|---|
| CA | 2387472 A1 | 10/2003 |
| CA | 2438225 A1 | 1/2005 |
| CA | 2568964 A1 | 8/2007 |
| CA | 2323912 C | 12/2008 |
| CA | 2392444 C | 5/2009 |
| CA | 2539812 C | 6/2009 |
| CA | 2645699 A1 | 6/2009 |
| CA | 2724874 A1 | 8/2011 |
| CA | 2701478 A1 | 10/2011 |
| CA | 2726684 A1 | 6/2012 |
| CA | 2892743 A1 | 6/2014 |
| CA | 2856022 A1 | 1/2015 |
| CA | 2645699 C | 6/2016 |
| CA | 2778879 C | 11/2017 |
| EP | 2090462 A3 | 11/2009 |
| EP | 2113415 B1 | 8/2010 |
| EP | 1894772 B1 | 7/2011 |
| EP | 2669147 A1 | 12/2013 |
| GB | 2335891 A | 10/1999 |
| WO | 9907595 A1 | 2/1992 |
| WO | 2010003019 A3 | 4/2010 |
| WO | 2011056962 A1 | 5/2011 |
| WO | 2014090407 A1 | 6/2014 |
| WO | 2015055323 A1 | 4/2015 |
| WO | 2015150206 A1 | 10/2015 |

* cited by examiner

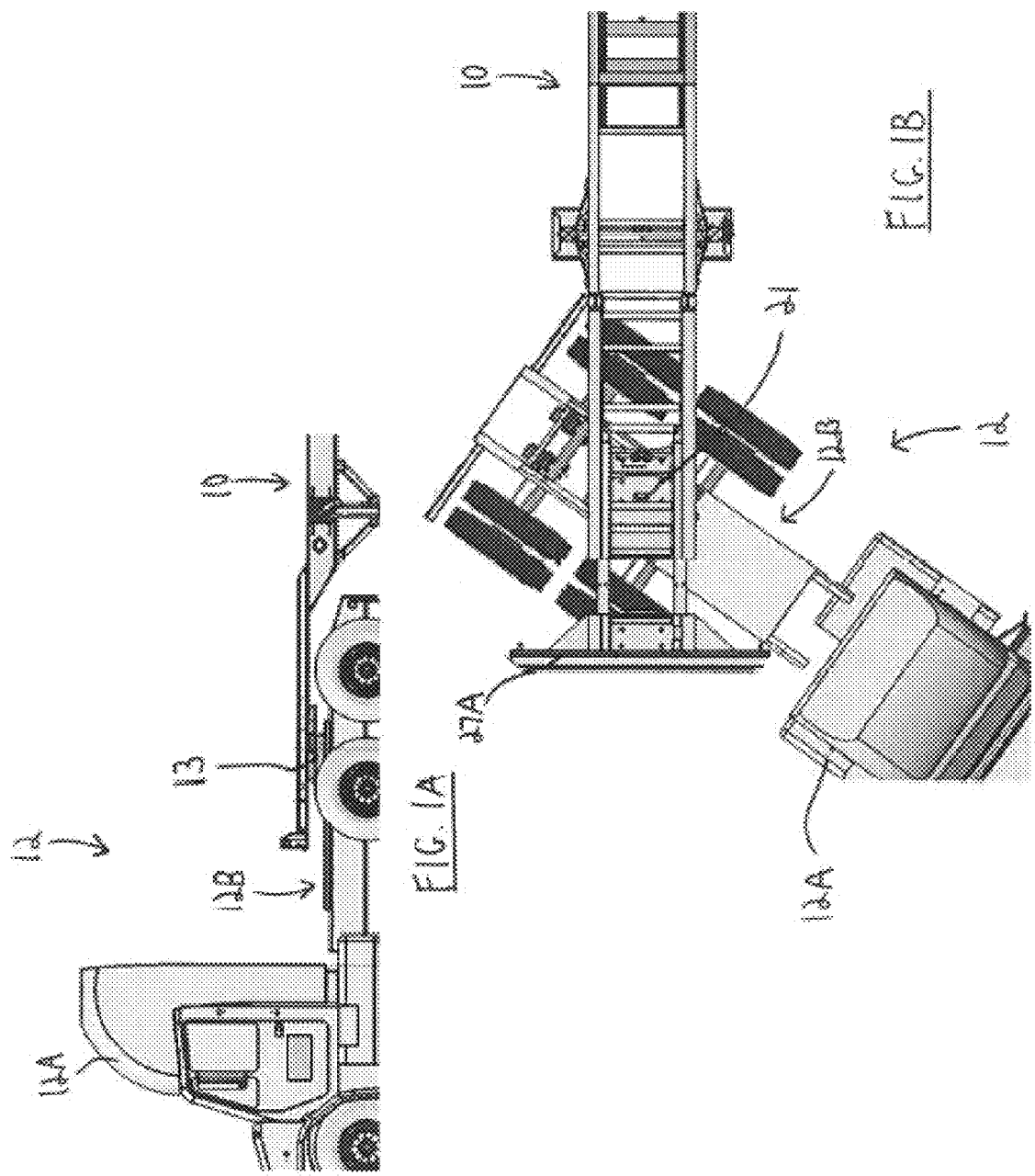

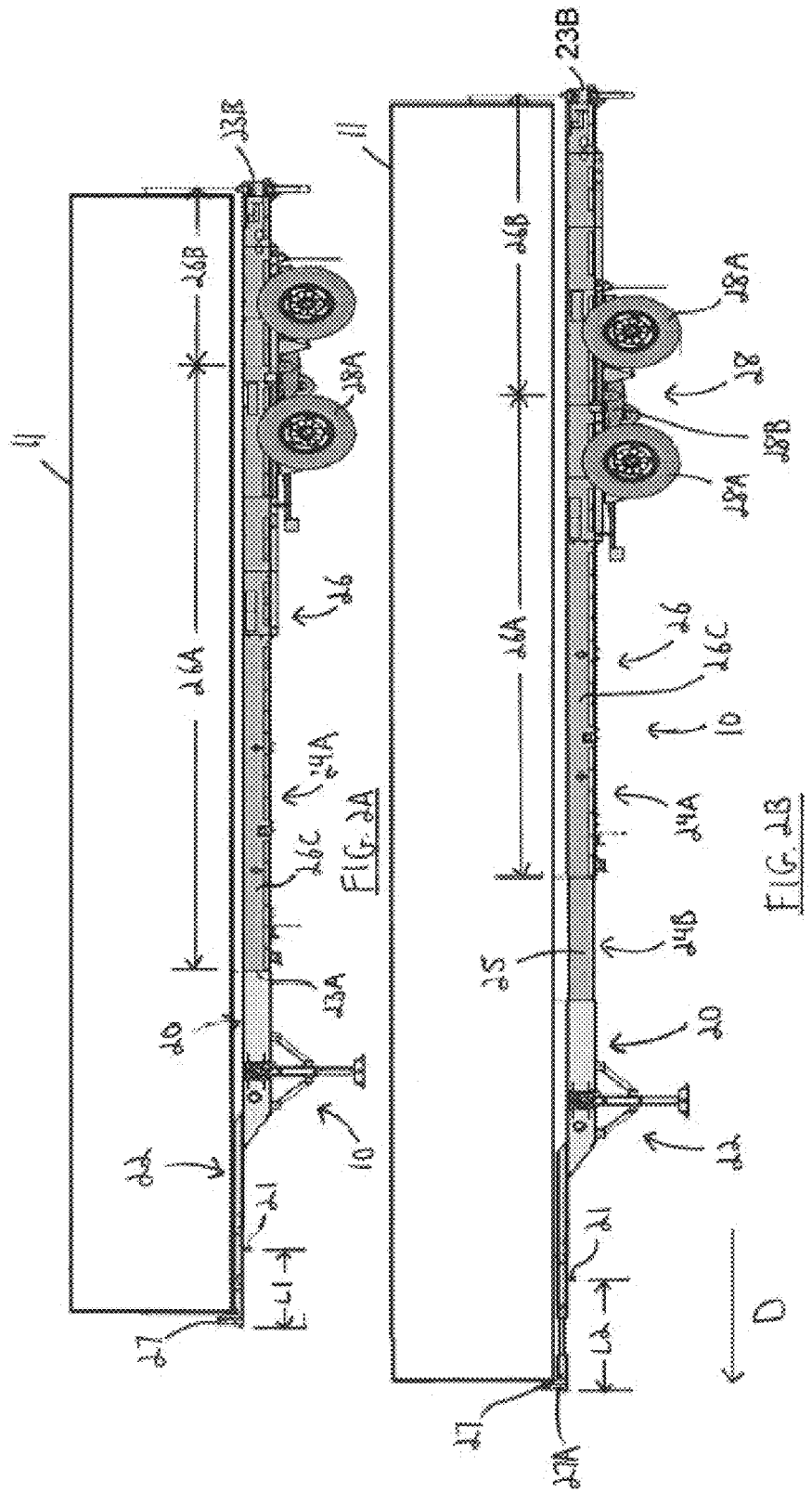

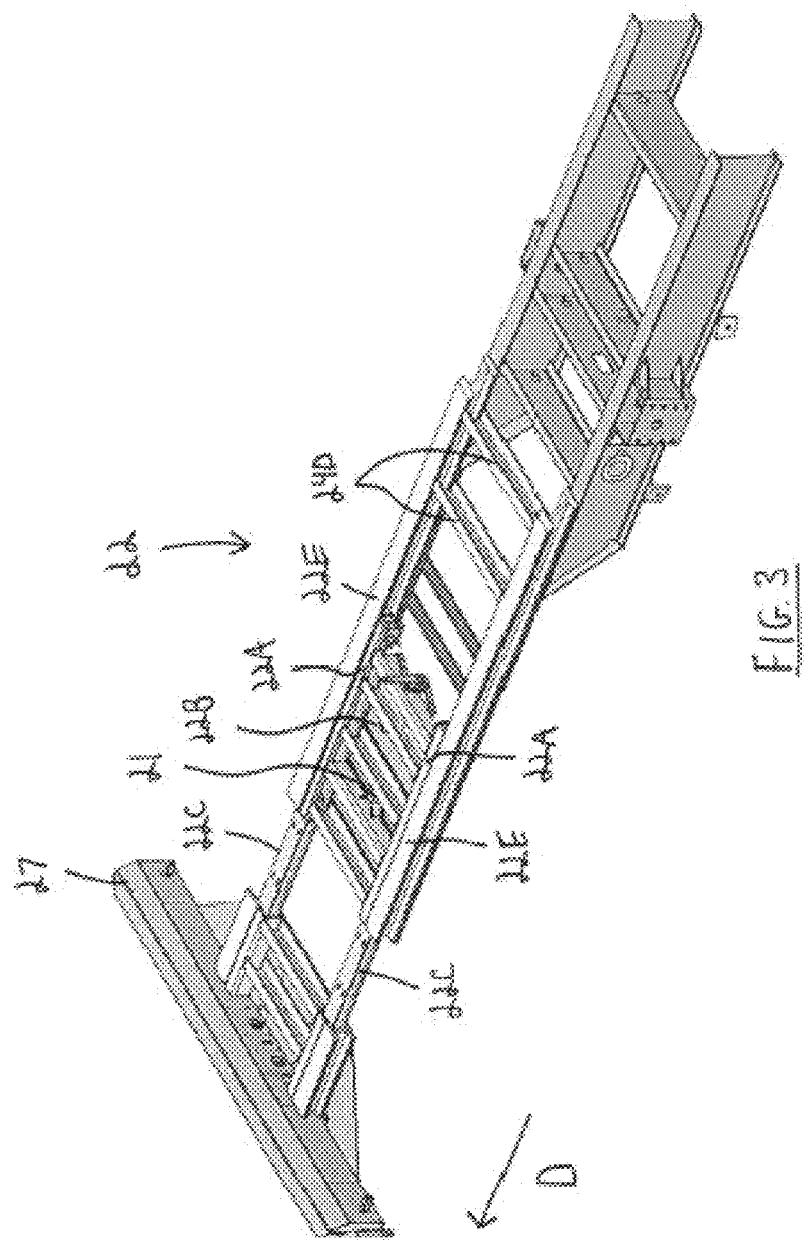

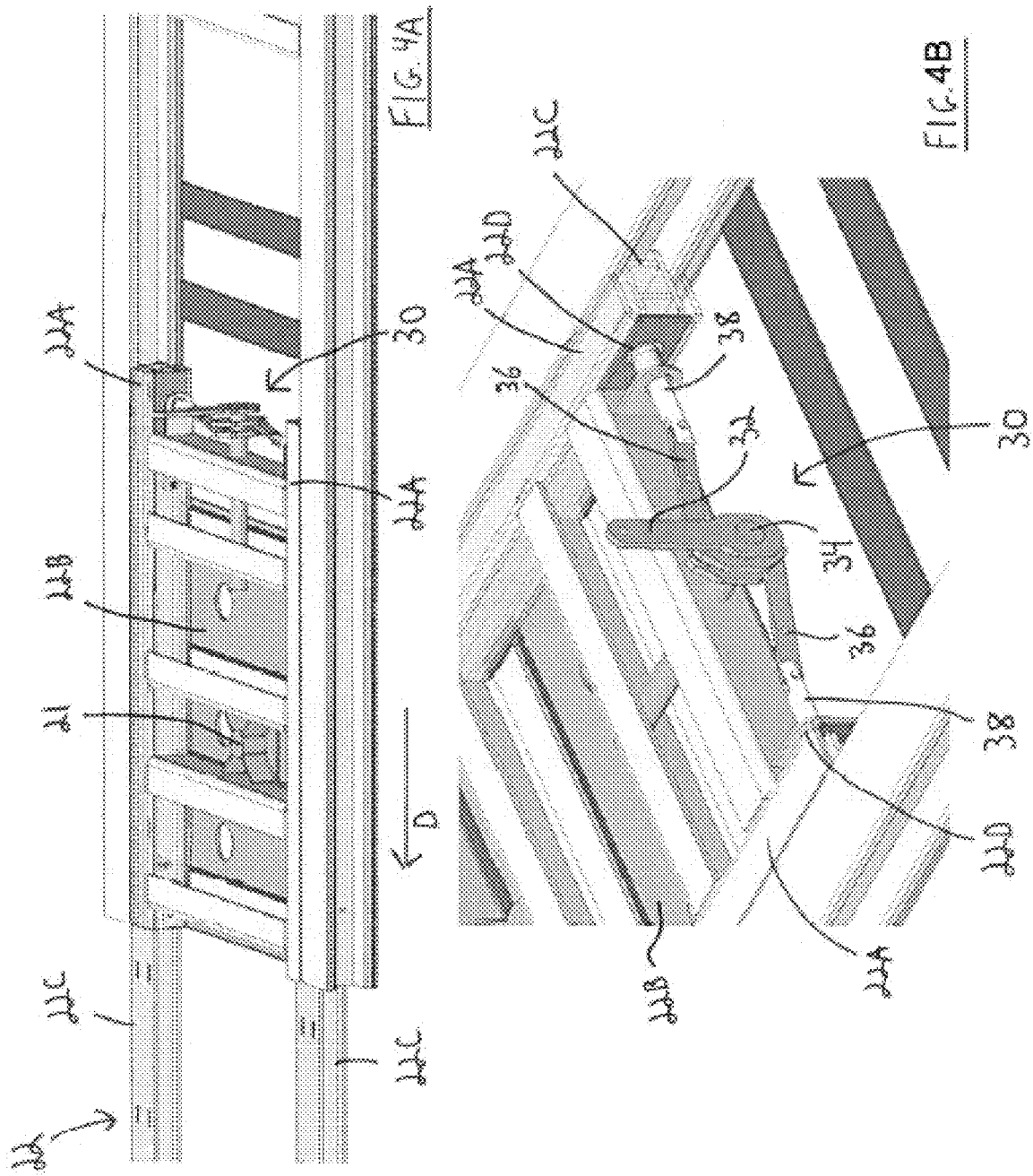

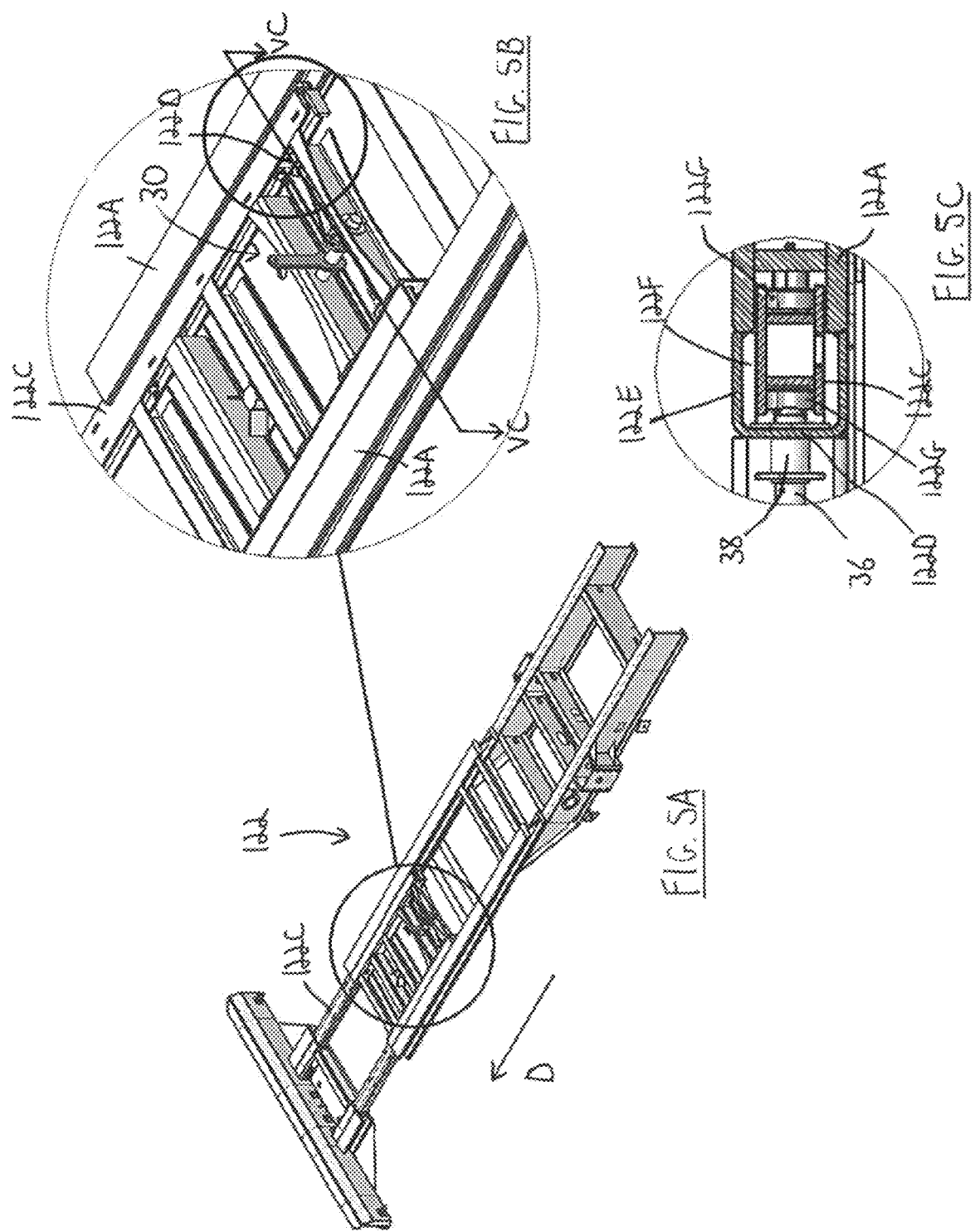

EXTENDABLE TRAILER FOR FREIGHT CONTAINERS

CROSS-REFERENCE TO RELATED APPLICATIONS

This application claims priority to U.S. provisional patent application No. 62/436,636 filed Dec. 20, 2016, the entire contents of which are incorporated by reference herein.

TECHNICAL FIELD

The application relates generally to a trailer for transporting freight containers and, more particularly, to an extendable trailer for containers.

BACKGROUND OF THE ART

Container-handling transport vehicles of various types are known for transporting different types of freight containers on public roads. However, these transport vehicles and containers have to abide by government regulations when traveling on public roads. Accordingly, containers are manufactured with strict design regulations as to size.

The size, and in particular the length, of freight containers is increasing, reflecting a growing desire to transport larger volumes with a single transport vehicle. The size of the container, however, is limited by the capacity of the trailer used to transport it. Regulations and/or certification standards limit the overall size of trailers, and limit which components of a trailer can be increased in length.

SUMMARY

In one aspect, there is provided a trailer for transporting a container, comprising: a frame mountable to a vehicle at a rear portion thereof, the frame having a rear frame section mountable above a rear wheel assembly of the trailer, and a front frame section connected to and disposed forward of the rear frame section in a forward direction of travel of the vehicle, the front frame section having a king pin mountable to a hitch of the vehicle and a forward-most end, the forward-most end being moveable relative to the kingpin in a direction parallel to the forward direction of travel to extend and shorten a length of the front frame section between a fully-lengthened configuration and a fully-shortened configuration.

In another aspect, there is provided a vehicle for transporting a container, comprising: a tractor unit having a rear portion with a hitch; and trailer having a frame mountable to the rear portion of the tractor unit, the frame having a rear frame section mountable above a rear wheel assembly of the trailer, and a front frame section connected to and disposed forward of the rear frame section in a forward direction of travel of the vehicle, the front frame section having a king pin mountable to the hitch of the tractor unit and a forward-most end, the forward-most end being moveable relative to the kingpin in a direction parallel to the forward direction of travel to extend and shorten a length of the front frame section between a fully-lengthened configuration and a fully-shortened configuration.

In a further aspect, there is provided a method of increasing a length of a trailer, the trailer having a frame including interconnected front and rear frame sections, the method comprising: slidingly displacing a forward-most end of the front frame section in a forward direction of travel of the trailer relative to a kingpin of the front frame section to extend and shorten a length of the front frame section.

DESCRIPTION OF THE DRAWINGS

Reference is now made to the accompanying figures in which:

FIG. 1A is a schematic side elevational view of part of a vehicle with a tractor unit and a trailer;

FIG. 1B is a top view of part of the vehicle, tractor unit, and trailer of FIG. 1A;

FIG. 2A is a side elevational view of the complete trailer of FIG. 1A;

FIG. 2B is another side elevation view of the complete trailer of FIG. 1A, the trailer being shown in an extended configuration;

FIG. 3 is a perspective view of a front frame section of the trailer of FIG. 1A;

FIG. 4A is a perspective view of the front frame section of FIG. 3 and a locking mechanism thereof;

FIG. 4B is an enlarged view of the locking mechanism of FIG. 4A;

FIG. 5A is a perspective view of a front frame section of a trailer, according to another embodiment of the present disclosure;

FIG. 5B is an enlarged view of the circled portion of the front frame section in FIG. 5A; and FIG. 5C is an enlarged cross-sectional view taken along the line VC-VC of the circled portion in FIG. 5B.

DETAILED DESCRIPTION

FIGS. 1A and 1B illustrate a vehicle 12 for transporting a freight container 11 (see FIGS. 2A and 2B). The vehicle 12 has a tractor unit 12A or cab which provides the motive force to the vehicle 12. A rear portion 12B of the tractor unit 12A forms a rear flat-bed onto which a trailer 10 of the vehicle 12 can be mounted. The trailer 10 is extendable in length, such that its length can be increased and decreased. The length of the trailer can be increased to accommodate longer containers 11. The trailer 10 in the depicted embodiment is a semi-trailer 10, and the vehicle 12 is a semi-trailer truck. The trailer 10 can be any other type of chassis for the container 11. The trailer 10 is mounted to the rear portion 12B of the tractor unit 12A. The rear portion 12B has a hitch 13, such as a gooseneck or a fifth-wheel hitch 13. A corresponding kingpin 21 (see FIGS. 2A and 2B) of the trailer 10 is mounted to, and removable, from the hitch 13, to mount the trailer 10 to the rear portion 12B of the tractor unit 12A. In the depicted embodiment, the tractor unit 12A is a truck for displacing the trailer 10 and the container 11 stored thereon. In alternate embodiments, the tractor unit 12A is a tractor, a pick-up truck, or a motorized cab, among other possibilities. The tractor unit 12A is therefore not limited to being semi-tractor of the depicted embodiment. Similarly, although shown as a single container 11, the container 11 in alternate embodiments includes two or more containers 11 mounted to the trailer 10. The container 11 is preferably, but not exclusively, ISO certified.

Referring to FIGS. 2A and 2B, the trailer 10 includes a frame 20 which forms the corpus of the trailer 10 and provides structure thereto. The frame 20 is any suitable structure made of reinforced structural members selected to withstand the loads generated by the container 11 and during transport thereof. As described in greater detail below, a portion of the frame 20 is mountable to the rear portion 12B of the tractor unit 12A. The frame 20 in the depicted embodiment includes two sections: a front frame section 22 and a rear frame section 26. The terms "front", "forward", "rear", and "rearward" are defined in relation to the position of the tractor unit 12A, such that front frame section 22 is the closest frame section 22,26 to the tractor unit 12A when the frame 20 is mounted thereto, and the rear frame section 26 is the frame section 22,26 positioned furthest away from the tractor unit 12A. In alternate embodiments, the frame 20 includes additional frame segments, such as a middle frame segment, and thus may have more than two frame segments. Each frame section 22,26 will now be described in greater detail beginning with the rear frame section 26 and working forwardly.

The rear frame section 26 is mounted to, and removable from, a rear wheel assembly 28. The rear wheel assembly 28 includes one or more rear wheels 28A with suitable dampening mechanisms, and includes a wheel chassis 28B to which the rear wheels 28A are mounted. In the depicted embodiment, the rear frame section 26 is mounted to the wheel chassis 28B of the rear wheel assembly 28. More particularly, the rear frame section 26 is mounted to the wheel chassis 28B so as to be displaced relative thereto. In the depicted embodiment, the rear frame section 26 is slidingly displaceable relative to the rear wheel assembly 28. This allows the rear frame section 26 to displace in a linear manner in a forward and rearward direction, where the forward direction is defined as being along a forward direction of travel D of the vehicle 12 and where the rearward direction is opposite to the forward direction. The relative movement of the rear frame section 26 and the rear wheel assembly 28 is achieved by bearings, wheels, lubricants, low-friction materials, or other suitable displacement enhancers. In the depicted embodiment, the rear frame section 26 is slidingly displaced by being manually pulled. In an alternate embodiment, the rear frame section 26 is displaced by a motorized assist, such as a motor or an actuator. In another alternate embodiment, the rear frame section 26 is displaced by driving the vehicle 12 in a rearward direction and by blocking the displacement of the rear wheels 28A.

Still referring to FIGS. 2A and 2B, the rear frame section 26 has a first segment 24A which has a fixed or constant length, and which is mountable above the rear wheel assembly 28 to be moveable with respect to the rear wheel assembly 28 parallel to the direction D. The rear frame section also has a second segment 24B which is connected to the first segment 24A. The second segment 24B is displaceable with respect to the first segment 24A parallel to the direction D to increase and decrease the length of the rear frame section 26. The displacement or movement of the first and second segments 24A,24B of the rear frame section 26 is now described in greater detail.

The first segment 24A is moveable with respect to the rear wheel assembly 28 parallel to the direction D between a first position (FIG. 2A) and a second position (FIG. 2B). The fixed length of the first segment 24A is divided into a front length 26A defined between a front end 23A of the first segment 24A and the rear wheel assembly 28 or a portion thereof, and a rear length 26B defined between a rear end 23B of the first segment 24A and the rear wheel assembly 28. When the first segment 24A is moved relative to the rear wheel assembly 28 to be in the first position, as shown in FIG. 2A, the magnitude of the rear length 26B is less than it is when the first segment 24A is in the second position (see FIG. 2B). Stated differently, more of the fixed length of the first segment 24A is shifted rearwardly of the rear wheel assembly 28 when the first segment 24A is moved relative to the rear wheel assembly 28 from the first position to the second position. Conversely, the front length 26A when the first segment 24A is in the first position is greater than the front length 26A when the first segment is in the second position. Therefore, as can be seen in FIGS. 2A and 2B, after displacement of the first segment 24A to the second position, the rear length 26B increases in length and the front length 26A decrease in length. This movement of the first segment 24A may help to provide weight balancing of the freight container 11 relative to the rear wheel assembly 28 by creating a balancing or compensating moment about the rear wheel assembly 28. Furthermore, this movement of the first segment 24A of the rear frame section 26 provides space towards the front of the trailer 10 for other components of the frame 20 to extend in length, as will be explained in greater detail below.

Indeed, with the rearward displacement of the first segment 24A of the rear frame section 26, the second segment 24B of the rear frame section 26 has more room to increase in length. Still referring to FIGS. 2A and 2B, the first segment 24A has support beams 26C spaced apart on opposite sides of the rear frame section 26 and cross beams spaced apart along the forward direction of travel D and extending between the support beams 26C. The second segment 24B has extension beams 25 spaced apart on opposite sides of the rear frame section 26. The extension beams 25 extend between the front frame section 22 and the support beams 26C of the first segment 24A, and thus link the rear frame section 26 to the front frame section 22. Each extension beam 25 is displaceably mounted to a corresponding support beam 26C. In the depicted embodiment, each extension beam 25 is housed within a corresponding support beam 26C. In an alternate embodiment, each extension beam 25 is mounted parallel to an outer surface of a corresponding support beam 26C. Other mounting configurations are also possible. Each extension beam 25 is moveable relative to the corresponding support beam 26C in a direction parallel to the forward direction of travel D. In FIG. 2B, the nested extension beams 25 are each housed within a corresponding support beam 26C of the first segment 24A. The extension beams 25 are displaceably mounted within the support beams 26C, such as with bearings, sliding pads, wheels, and the like. During sliding displacement of the second segment 24B relative to the first segment 24A, the nested extension beams 25 telescopically emerge from within the support beams 26C and slide outwardly therefrom. Suitable locking mechanisms (rods, latches, etc.) are used to arrest and to allow relative displacement between the extension beams 25 and the support beams 26C.

In the depicted embodiment, the second segment 24B of the rear frame section 26 is slidingly displaced by being manually pulled in the direction of travel D away from the first segment 24A. In an alternate embodiment, the seconds segment 24B is displaced with a motorized assist, such as a motor or an actuator. In another alternate embodiment, the second segment 24B is displaced by driving the tractor unit 12A in the direction of travel D and by blocking the displacement of the rear wheels 28A. This movement of the second segment 24B relative to the first segment 24A increases the overall length of the rear frame section 26, and thus of the trailer 10, without causing the trailer 10 to abut against the tractor unit 12A, particularly in the embodiment where the rear frame section 26 has already been rearwardly displaced.

Still referring to FIGS. 2A and 2B, the front frame section 22, or portions thereof, are slidingly displaceable along the direction of travel D relative to the second segment 24B of the rear frame section 26. The kingpin 21 of the trailer 10 is located on the front frame section 22. The front frame section 22 also has a forward-most end 27. The forward-most end 27 is the portion of the front frame section 22 that is closest to the cabin of the tractor unit 12A when the trailer 10 is mounted to the tractor unit 12A. In the depicted embodiment, the forward-most end 27 includes a forward boom 27A of the trailer 10. The kingpin 21 is mounted to the rear portion 12B of the tractor unit 12A. More particularly, the kingpin 21 slides into the fifth-wheel or gooseneck hitch 13 of the rear portion 12B. The front frame section 22 may therefore be referred to as a "gooseneck" or "gooseneck portion" of the trailer 10.

Similarly to the second segment 24B of the rear frame section 26, in the depicted embodiment, the forward-most end 27 is slidingly displaceable relative to the kingpin 21 and a remainder of a stationary portion of the front frame section 22. The kingpin 21 is therefore stationary, and the forward-most end 27 or the forward boom 27A are displaced away from the kingpin 21 along and opposite to the forward direction of travel D. The forward-most end in the depicted embodiment is manually pulled in the direction of travel D away from the second segment 24B and toward the tractor unit 12A. This movement of the forward-most end 27 extends the overall length of the front frame section 22, and thus the overall length of the trailer 10, without causing the trailer 10 to abut against the tractor unit 12A.

More particularly, and as shown in FIGS. 2A and 2B, the displacement of the forward-most end 27 relative to the kingpin 21 extends and shortens the length of the front frame section 22 between a fully-lengthened configuration (FIG. 2B) and a fully-shortened configuration (FIG. 2A). In the fully-shortened configuration, the length of the front frame section 22 is less than the length of the front frame section 22 in the fully-lengthened configuration. More particularly, a first length L1 in the fully-shortened configuration is defined between the kingpin 21 and the forward-most end 27, and a second length L2 in the fully-lengthened configuration is defined between the kingpin 21 and the forward-most end 27. In the depicted embodiment, the first length L1 is about 36 in. within a range of acceptable tolerances, and the second length L2 is about 62 in. within a range of acceptable tolerances. This increase in the length of the front frame section 22 contributes to the overall increase in length of the trailer 10 when it is extended. This increase in length of the front frame section 22 contributes to helping the trailer 10 accommodate longer containers 11, such as containers 11 being 60 ft. in length.

It can thus be appreciated that the combined relative displacement of the front and rear frame sections 22,26 allows for a maximum increase in the overall length of the trailer 10. Each frame section 22,26 increases in length, or allows for an increase in length, such that collectively the increases in length provide a trailer 10 with an overall increased length, as is more easily visualized by comparing FIGS. 2A and 2B. The longer trailer 10 may therefore receive a longer container 11 thereon, as is also more easily visualized by comparing FIGS. 2A and 2B. In the depicted embodiment, the length of each frame section 22,26 is adjustable independently of the other frame section sections 22,26. This independent adjustability of the frame sections 22,26 allows for a large number of possible lengths for the trailer 10 to accommodate containers 11 of many different lengths. This also allows the user of the trailer 10 to select the desired overall length of the trailer 10, thereby allowing the user to match the length of the trailer 10 to the length of the container 11 to be transported thereon.

FIG. 3 shows the front frame section 22 in greater detail. The front frame section 22 has support beams 22A spaced apart on opposite sides of the front frame section 22 and a support platform 22B extending between the support beams 22A. The support platform 22B is a planar body which supports and houses the kingpin 21. The front frame section 22 also includes extension beams 22C which are spaced apart on opposite sides of the front frame section 22. The extension beams 22C extend between the forward-most end 27 of the front frame section 22 and the support beams 22A, thereby linking the forward most end 27 to the remainder of the front frame section 22. Each extension beam 22C is displaceably mounted to a corresponding support beam 22A and is moveable relative to the corresponding support beam 22A in a direction parallel to the forward direction of travel D.

In the depicted embodiment, the extension beams 22C are nested and each housed within a corresponding support beam 22A. In the depicted embodiment, the nested extension beams 22C are H-beams, and are thus relatively sturdy to support the loads generated by the container 11 along the front frame section 22. The nested extension beams 22C are displaceably mounted within the support beams 22A, such as with bearings, sliding pads, wheels, and the like. During sliding displacement of the forward-most end 27 relative to the kingpin 21 along the direction of travel D, the nested extension beams 22C telescopically emerge from within the support beams 22A and slide outwardly therefrom. Suitable locking mechanisms (rods, latches, etc.) are used to arrest and to allow relative displacement between the nested extension beams 22C and the support 22A. The front frame section 22 also includes cross beams 24D extending between the support beams 22A and being transverse thereto for bracing and supporting the front frame section 22. The front frame section 22 includes outer side beams 22E fixedly mounted on outer portions of the support beams 22A.

Referring to FIGS. 4A and 4B, the front frame section 22 includes a locking mechanism 30 to arrest and allow the relative displacement of the nested extension beams 22C and the support beams 22A. The locking mechanism 30 is manually operated by the user, and is free of pneumatic, hydraulic, or electric mechanical assists. This allows the user to manually displace the nested extension beams 22C in the direction of travel D relative to the inner support beams 22A.

The locking mechanism 30 in the depicted embodiment includes a lever-actuated mechanism. More particularly, the locking mechanism 30 includes a lever 32 rotatably mounted about a hinge 34 and coupled to opposite linkage members 36. In the depicted embodiment, the hinge 34 includes a rotatable rod supported by a suitable bearing and mounted to the support platform 22B. Each linkage member 36 has a distal end 38 insertable through openings 22D in both the inner support beams 22A and the nested extension beams 22C. When the user rotates the lever 32 in a first direction about the hinge 34, the distal ends 38 of the linkage members 36 are withdrawn from the openings 22D in the inner support beams 22A and the nested extension beams 22C. This allows the nested extension beams 22C to be displaced in the direction of travel D relative to the stationary support beams 22A. Similarly, when the user rotates the lever 32 in a second direction about the hinge 34 opposite to the first direction, the distal ends 38 of the linkage members 36 are inserted through the openings 22D in the support beams 22A and the nested extension beams 22C. Portions of the linkage members 36 therefore extend through both the inner support beams 22A and the nested extension beams 22C. This prevents the extension beams 22C from being displaced relative to the stationary support beams 22A, thereby locking the extension beams 22C in place at the desired length of extension. Multiple openings 22D are provided along the length of the support beams 22A and the extension beams 22C so that the length of the extended extension beams 22C, and thus the extended length of the front frame section 22, can be selected. Alternate embodiments for the locking mechanism 30 are also within the scope of the present disclosure.

FIGS. 5A to 5C show another embodiment of the front frame section 122. Some of the stationary architecture of the front frame section 122 includes a stationary support beam 122A and a stationary cover 122E having a "C" cross-sectional shape mounted thereto. The support beam 122A and the cover 122E cooperate to form a channel 122F on both sides of the front frame section 122. Each extension beam 122C is positioned within the channel 122F and displaceable therein with respect to the support beam 122A and the cover 122E in a direction parallel to the forward direction of travel D. Each extension beam 122C is displaceable with the assistance of cam rollers 122G mounted to the support beam 122A and to the cover 122E. The locking mechanism 30 is similar to the one described above and thus the description of its components will not be repeated. The distal ends 38 of the linkage members 36 are insertable into openings 122D in the cover 122E, and engage the extension beams 122C.

There is also disclosed a method of increasing a length of a trailer 10. The method includes slidingly displacing the forward-most end 27 of the front frame section 22 in a forward direction of travel D relative to the kingpin 21 to extend and shorten a length of the front frame section 22.

In light of the preceding, it can be appreciated that the trailer 10 disclosed herein allows a user, such as a driver, to open and close a gooseneck portion manually with relatively little effort. The front of the trailer 10, which can include a gooseneck mount, can be extended forwardly using a relatively simple mechanical design with a lever-type locking mechanism 30 to secure the gooseneck into position.

The trailer 10 disclosed herein can be extended in length to accommodate a container 11 of any suitable length. For example, the frame sections 22,26 can also be extended such that the overall length of the trailer 10 is about sixty feet (60'). Other overall lengths are also within the scope of the present disclosure. Furthermore, the ability to increase the length of each frame section 22,26 independently of the other frame section sections 22,26 allows the user to only extend those sections 22,26 of the trailer allowed for by regulations.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A trailer for transporting a container, comprising: a frame mountable to a vehicle at a rear portion thereof, the frame having a rear frame section mountable above a rear wheel assembly of the trailer, and a front frame section connected to and disposed forward of the rear frame section in a forward direction of travel of the vehicle, the front frame section having a king pin mountable to a hitch of the vehicle and a forward-most end, the forward-most end being moveable relative to the kingpin in a direction parallel to the forward direction of travel to extend and shorten a length of the front frame section between a fully-lengthened configuration and a fully-shortened configuration.

2. The trailer as defined in claim 1, wherein the front frame section has a first length in the fully-shortened configuration defined between the kingpin and the forward-most end, and has a second length in the fully-lengthened configuration defined between the kingpin and the forward-most end, the first length being about 36 in. and the second length being about 62 in.

3. The trailer as defined in claim 1, wherein the front frame section has support beams spaced apart on opposite sides of the front frame section and a support platform extending between the support beams and supporting the kingpin, the front frame section including extension beams spaced apart on opposite sides of the front frame section and extending between the forward-most end and the support beams, each extension beam being displaceably mounted to a corresponding support beam and being moveable relative to the corresponding support beam in the direction parallel to the forward direction of travel.

4. The trailer as defined in claim 3, wherein the front frame section includes a locking mechanism having a lever rotatably mounted about a hinge mounted to the support platform, the lever being coupled to opposite linkage members to displace the linkage members in a direction transverse to the forward direction of travel, each linkage member having a distal end insertable through openings in both the support beams and the extension beams to arrest movement of the extension beams relative to support beams.

5. The trailer as defined in claim 1, wherein the front frame section includes a locking mechanism to arrest movement of the forward-most end relative to the kingpin in the direction parallel to the forward direction of travel.

6. The trailer as defined in claim 5, wherein the locking mechanism is free of pneumatic, hydraulic, or electric mechanical assists and is manually operated.

7. The trailer as defined in claim 1, wherein the rear frame section is moveable relative to the rear wheel assembly in the direction parallel to the forward direction of travel to adjust a length of the rear frame section.

8. The trailer as defined in claim 7, wherein the length of the rear frame section is independently adjustable of the length of the front frame section.

9. The trailer as defined in claim 1, wherein the rear frame section has a first segment mountable above the rear wheel assembly and being moveable relative to the rear wheel assembly in the direction parallel to the forward direction of travel between a first position and a second position, and a second segment connected to the first segment and being moveable with respect to the first segment in the direction parallel to the forward direction of travel.

10. The trailer as defined in claim 9, wherein the first segment of the rear frame section has a front length defined between a front end of the first segment and the rear wheel assembly, and a rear length defined between a rear end of the first segment and the rear wheel assembly, the rear length upon the first segment being in the first position being less than the rear length upon the first segment being in the second position.

11. The trailer as defined in claim 9, wherein the first segment has support beams spaced apart on opposite sides of the rear frame section and cross beams being spaced apart along the forward direction of travel and extending between the support beams, the second segment including extension beams spaced apart on opposite sides of the rear frame section and extending between the front frame section and the support beams, each extension beam being displaceably mounted to a corresponding support beam and being moveable relative to the corresponding support beam in the direction parallel to the forward direction of travel.

12. The trailer as defined in claim 1, wherein the rear frame section is slidingly displaceable relative to the rear wheel assembly in a rearward direction opposite to the forward direction of travel.

13. The trailer as defined in claim 1, wherein the forward-most end of the front frame section is manually moveable.

14. A vehicle for transporting a container, comprising:
a tractor unit having a rear portion with a hitch; and
trailer having a frame mountable to the rear portion of the tractor unit, the frame having a rear frame section mountable above a rear wheel assembly of the trailer, and a front frame section connected to and disposed forward of the rear frame section in a forward direction of travel of the vehicle, the front frame section having a king pin mountable to the hitch of the tractor unit and a forward-most end, the forward-most end being moveable relative to the kingpin in a direction parallel to the forward direction of travel to extend and shorten a length of the front frame section between a fully-lengthened configuration and a fully-shortened configuration.

15. The vehicle as defined in claim 14, wherein the front frame section has a first length in the fully-shortened configuration defined between the kingpin and the forward-most end, and has a second length in the fully-lengthened configuration defined between the kingpin and the forward-most end, the first length being about 36 in. and the second length being about 62 in.

16. The vehicle as defined in claim 14, wherein the rear frame section has a first segment mountable above the rear wheel assembly and being moveable relative to the rear wheel assembly in the direction parallel to the forward direction of travel between a first position and a second position, and a second segment connected to the first segment and being moveable with respect to the first segment in the direction parallel to the forward direction of travel.

17. The vehicle as defined in claim 16, wherein the first segment of the rear frame section has a front length defined between a front end of the first segment and the rear wheel assembly, and a rear length defined between a rear end of the first segment and the rear wheel assembly, the rear length when the first segment is in the first position being less than the rear length when the first segment is in the second position.

18. A method of increasing a length of a trailer, the trailer having a frame including interconnected front and rear frame sections, the method comprising: slidingly displacing a forward-most end of the front frame section in a forward direction of travel of the trailer relative to a kingpin of the front frame section to extend and shorten a length of the front frame section.

19. The method as defined in claim 18, wherein slidingly displacing the forward-most end includes slidingly displacing the forward-most end to a maximum length of the front frame section defined between the kingpin and the forward-most end of about 62 in.

20. The method as defined in claim 18, wherein slidingly displacing the forward-most end includes manually slidingly displacing the forward-most end.

* * * * *